(No Model.)
L. A. CASGRAIN.
BUFFING ROLL.
No. 540,828. Patented June 11, 1895.
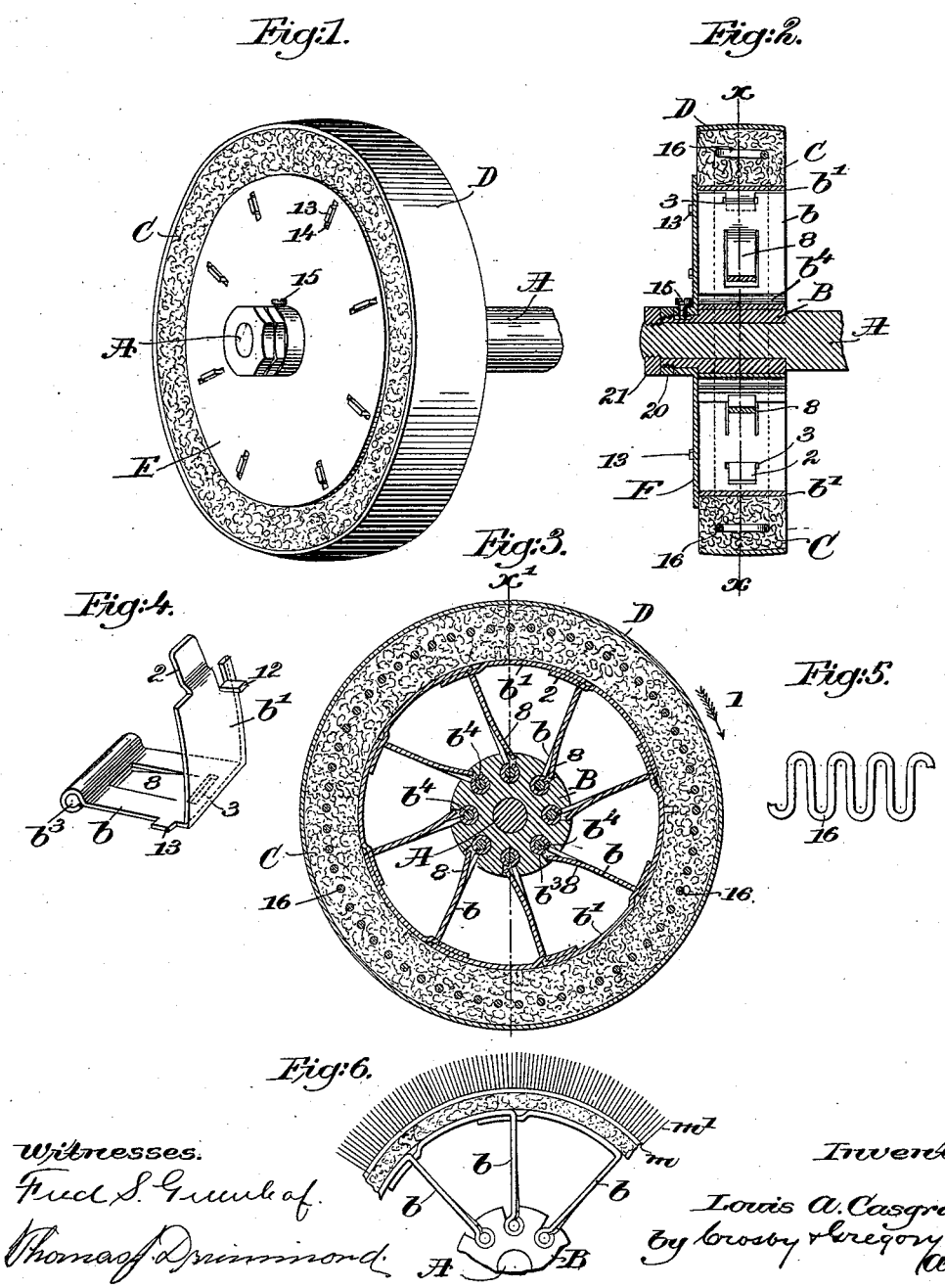

UNITED STATES PATENT OFFICE.

LOUIS A. CASGRAIN, OF WINCHESTER, MASSACHUSETTS.

BUFFING-ROLL.

SPECIFICATION forming part of Letters Patent No. 540,828, dated June 11, 1895.

Application filed August 27, 1894. Serial No. 521,365. (No model.)

*To all whom it may concern:*

Be it known that I, LOUIS A. CASGRAIN, a subject of the Queen of Great Britain, residing at Winchester, county of Middlesex, State of Massachusetts, have invented an Improvement in Buffing-Rolls, of which the following description, in connection with the accompanying drawings, is a specification, like letters and numerals on the drawings representing like parts.

This invention has for its object the production of a strong, serviceable light-weight buffing roll adapted to receive and hold a surrounding tubular jacket, the construction of the roll being such as to enable it to expand when in rapid rotation, to thus hold the jacket snugly.

My invention consists essentially of a hub having a connected series of yielding L-shaped arms, having their faces arranged in a circle, and adapted to engage the interior of a surrounding tubular body or jacket.

Figure 1 represents a buffing-roll embodying my invention. Fig. 2 is a section thereof parallel to the shaft carrying the roll. Fig. 3 is a section in the line $x$, Fig. 2, line $x'$ showing the section for Fig. 2. Fig. 4 shows one of the arms detached. Fig. 5 shows a piece of spring such as used in jacket C, and Fig. 6 shows a modification.

The shaft A has a hub B from which extend the L-shaped arms $b$, they having segmental faces $b'$ arranged one behind the other to form a substantially circular periphery to engage the interior of and act as a support for a ring or tubular jacket C, preferably of a yielding, flexible material, and as shown in Figs. 1 to 3, said jacket is adapted to hold a tubular or abrasive sleeve D of any usual or suitable character, the L-shaped arms being so constructed as to occupy positions more or less out of radial lines with relation to the center of the hub, to thereby enable the faces $b'$ of said arms to lie in a circle of greater or less diameter to enable the jacket, or it may be the sleeve upon the jacket, to be put onto, or to be removed from the roll, the more nearly radial the arms the farther the said faces from the center of the hub, and the greater the expansion of the roll in the jacket to thus hold the same snugly while the roll is being rotated.

In Figs. 1 to 3, I have shown the L-shaped arms of steel, and as having at their inner ends eyes $b^3$ to receive pins $b^4$ by which to hold said eyes loosely in suitable seats in the hub, springs 8 connected to or forming part of said arms acting to keep them in their normal position, the faces of said arms being shown each as provided with a tongue 2 to enter a slot 3 in the main part of an adjacent arm, thus coupling the arms together, and each arm may have a prong 12 to enter the jacket C, and also an ear 13 to enter a suitable slot 14 in an adjusting plate E adjustably mounted on the end of the hub B by a set screw 15. By loosening the screw 15 and engaging with one hand the roll, and turning the latter in the direction of the arrow 1, Fig. 3, the diameter of the roll may be sufficiently contracted to enable the sleeve to be drawn off the jacket, but rotation of the shaft and roll in the direction of said arrow 1, will result in the expansion of the roll inside and so as to hold the jacket tightly on the roll and the sleeve tightly on the jacket.

The hub B may be of any desired length and diameter, and the arms may be more or less flexible, and centrifugal action tends to expand the roll in the jacket.

The springs 8 aid in taking up any undue vibration, and also aid in keeping the lower ends of the arms seated in the hub.

The jacket C shown in Fig. 1 may be stiffened somewhat, so that it may be kept up to its work, by the introduction into the same of a spring 16, shown in this present instance of my invention as composed of wire bent back and forth upon itself, as represented in Fig. 5.

The spring may be placed in the body of the roll either annularly or spirally as may be desired.

The yielding arms act after the manner of an expanding clutch and engage firmly the interior of the surrounding jacket or body, and a roll composed of the hub and the arms described may be used to hold different tubular bodies or jackets; so this invention is not limited in all instances to holding a tubular jacket or body of just the nature herein more specifically described, and the sleeve may if desired, be made as shown in Fig. 6, wherein $m$ represents a flexible sleeve having a series of brush-like teeth $m'$.

The collar 20 screwed onto one end of the hub B keeps the plate E on the hub, but the point of the screw 15 enters a short peripheral groove in the hub, so that when the screw 15 is loosened, the plate E may be adjusted or turned and the screw then be reset to hold the plate in place.

The collar 21 keeps the hub on shaft A.

Having described my invention, what I claim as new, and desire to secure by Letters Patent, is—

1. The hub, its series of rigid swinging arms pivoted to the hub and provided with segmental faces, combined with a surrounding flexible ring interiorly engaged by said segmental faces, substantially as described.

2. A hub having a series of seats, and a series of L-shaped rigid but movable arms pivoted with relation to said seats to turn on said hub, and a flexible surrounding jacket, rotation of the hub in one direction while the jacket is restrained, causing the outer ends of said arms to be contracted into a smaller circle, the rotation of the hub in the opposite direction with the jacket restrained, causing the outer ends of said arms to occupy positions in a larger circle, substantially as described.

3. The hub and its connected series of L-shaped arms having tongues, the tongue of one arm entering a slot in an adjacent arm, substantially as described.

4. The hub and its series of yielding arms having segmental faces, combined with an adjusting plate loosely connected with said arms and adjustable about the center of the said hub to thereby expand or contract the periphery of the hub, substantially as described.

5. The hub having a series of seats, and its loosely connected rigid arms having faces and springs 8, combined with a surrounding flexible jacket, engaged by said faces, the rotation of the hub in one direction while the jacket is prevented from rotation moving said arms toward radial position and expanding the hub of the jacket, and in the opposite direction moving said arms away from radial position and contracting the hub of the jacket, substantially as described.

6. An expansible hub, combined with an inclosing flexible jacket containing a flattened metallic spring embedded therein, both the inner and outer sides of each bend of the metal of the spring being acted upon by the material of the jacket, to operate, substantially as described.

In testimony whereof I have signed my name to this specification in the presence of two subscribing witnesses.

LOUIS A. CASGRAIN.

Witnesses:
GEO. W. GREGORY,
M. J. SHERIDAN.